United States Patent [19]

Wada et al.

[11] 4,414,273
[45] Nov. 8, 1983

[54] THERMAL RECORDING MATERIALS

[75] Inventors: Minoru Wada; Yonosuke Takahashi; Eiichi Hasegawa, all of Saitama, Japan

[73] Assignee: Fuji Photo Film Co., Ltd., Kanagawa, Japan

[21] Appl. No.: 380,319

[22] Filed: May 20, 1982

[30] Foreign Application Priority Data

May 20, 1981 [JP] Japan .................................. 56-74819

[51] Int. Cl.³ ........................ B32B 15/04; B32B 15/08
[52] U.S. Cl. .................................. 428/336; 346/76 L; 346/135.1; 428/457; 428/458; 428/461; 428/463; 428/913
[58] Field of Search ............... 428/913, 457, 458, 461, 428/689, 463, 336; 346/76 L, 135.1

[56] References Cited

U.S. PATENT DOCUMENTS 4,199,615  4/1980  Wacks et al. .................... 428/913 X
4,214,249  7/1980  Kasai et al. ......................... 346/76 L
4,320,169  3/1982  Yatabe et al. ................... 428/458 X Primary Examiner—Thomas J. Herbert, Jr.
Attorney, Agent, or Firm—Sughrue, Mion, Zinn, Macpeak and Seas

[57] ABSTRACT

Thermal recording materials comprising a thermal recording layer provided on a base, which do not deteriorate with the passage of time due to moisture or oxygen in the air, are disclosed, wherein a stabilizing film composed of at least one metal selected from the group consisting of In, Al, Ag, Au, Rh, Pd, Ir and Pt is provided on at least one face of the recording layer and the film has a thickness of 20 to 100 Å.

17 Claims, 3 Drawing Figures

THERMAL RECORDING MATERIALS

FIELD OF THE INVENTION

The present invention relates to thermal recording materials for recording information by thermally deforming a heat sensitive recording layer using beams or a flash of high energy density. Particularly, the present invention relates to thermal recording materials of the above described type wherein deterioration with the passage of time is prevented.

BACKGROUND OF THE INVENTION

Hitherto, as recording materials for recording using beams having a high energy density, such as a laser, etc., there have been used various materials including silver halide photosensitive materials. One such material is a recording material comprising a recording layer having high optical density where information is recorded when a beam having a high energy density is applied, i.e., where irradiated areas are locally heated to undergo a change such as melting, evaporation, aggregation, etc., whereby a difference in optical density results between irradiated areas and nonirradiated areas.

Generally, recording on such a thermal recording material is carried out by converting information to be recorded into an electric time series signal and scanning the recording material with a laser beam whose intensity is modulated according to the signal. This provides the advantage of a real time recording.

Such recording materials have been described in, for example, "Electron, Ion and Laser Beam Technology" by L. Levene et al., records in 11th Symposium (1969); "Electronics" page 50 (Mar. 18, 1968); "The Bell System Technical Journal" by D. Maydan, vol. 50, 1761 (1971); and "Sciene" by C. O. Carlson, vol. 154, 1550 (1966).

In many of these recording materials, a metal film is formed on a transparent plastic base by evaporation or sputtering, etc. Such materials have excellent properties as a thermal recording material, for example, images having a high resolving power can be recorded with high contrast.

As the transparent plastic base, plastic films of polymethyl methacrylate, polyvinyl chloride, polyethylene terephthalate, polycarbonate, polyamide, polystyrene, polyethylene, cross-linked polyethylene or polypropylene, etc. have been used.

In these recording materials, however, the thermal recording layer particularly deteriorates with the passage of time due to moisture or oxygen in the air to form pinholes or reduce the optical density. In particular, since the formation of pinholes of even a few micron size markedly reduces the commercial value of optical discs using the thermal recording layer, higher storability is required for the optical discs as compared to conventional thermal recording materials. Therefore, it has been proposed to provide a protective layer composed of an organic material on the recording layer or to provide air-sandwich recording materials where two recording elements having a thermal recording layer provided on a plastic base are provided such that the recording surfaces face each other through an air layer. However, the deterioration of the recording layer with the passage of time cannot be satisfactorily prevented, because moisture and oxygen pass through the plastic base.

SUMMARY OF THE INVENTION

The present invention prevents deterioration of the recording layer with the passage of time due to moisture or oxygen in the air, The object of the present invention was attained by providing thermal recording materials having a thermal recording layer provided on a base, where a stabilizing film composed of at least one metal selected from In, Al, Ag, Au, Rh, Pd, Ir and Pt is provided on at least one face of the recording layer at a thickness of 20 to 100 Å.

Figure 1:
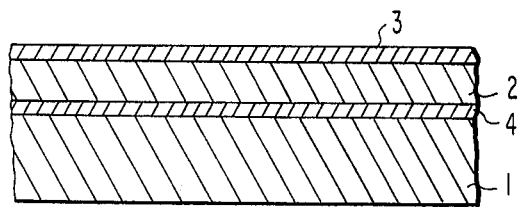
FIGS. 1 and 2 are enlarged sections of examples of recording materials of the present invention and FIG. 3 is a graph which shows the reduction of the optical density of the recording material with the passage of time where.

1, 11 and 11'—Base
2, 12 and 12'—Recording layer
3—Protective layer
4, 13 and 13'—Stabilizing film
20 and 21—Line indicating variation of optical density.

DETAILED DESCRIPTION OF THE INVENTION

In the following the present invention is illustrated in detail.

The recording materials according to the present invention have the fundamental construction a recording layer composed of a thermal recording material on a base, e.g. a plastic base.

As the base, a glass sheet and transparent plastics such as polymethyl methacrylate, polyethylene terephthalate, polycarbonate, polyvinyl chloride, polyamide, polystyrene, polyethylene, cross-linked polyethylene, polypropylene and copolymers thereof can be used in the present invention.

The recording layer used in the present invention is a layer having a high optical density and is preferably formed of a material having high covering power which can be used as a thin (e.g., 100–2,000 Å thick). As such materials, typically metals are used. In order to increase recording sensitivity, it is particularly preferred that the recording layer be composed of a mixture of metals and other substances as described later or has a multilayer construction composed of a metal layer and a layer of the substances.

The recording layer is the layer which undergoes a thermal change such as melting, evaporation or aggregation, etc., in irradiated areas upon application of high density irradiation such as a laser beam resulting in a change of optical transmittance or reflectivity, and such can be selected from various substances and various layer constructions according to the desired purpose.

As metals used for the recording layer, there can be illustrated Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi and Se, etc., which can be used alone or as a combination of two or more thereof. Particularly desirable requirements for metals used in the present invention are low toxicity, low energy required for melting or evaporating and a film thereof is easily formed, etc. Examples of the most preferred metals include Sn, Bi and In. One or more of these metals or an alloy thereof can be applied to a base directly or via an undercoating layer by various conventional methods such as vapor deposition, sputtering, ion-plating, electro-plating, electroless plating, etc., to form a single layer or a multilayer construction. Further, in the case of obtaining higher sensitivity, a layer in which substances as described later are physically mixed may be formed by a means such as co-vapor deposition, etc.

The thickness of the metal layer is acceptable if it provides an optical density level necessary to form the images. For example, in order to obtain a transmission density of 2, the thickness may be 300 to 1500 Å. The thickness, of course, depends upon the metal used.

To obtain high sensitivity, the above described metal layer can be laminated with substances as later described for increasing recording sensitivity, but it is preferred to use a layer composed of a mixture of the above described metal with such substances. When the substance is provided on the metal layer as a separate layer, the thickness of the substance layer is generally from 50 to 800 Å, and when it is used as a mixture with the metal, the substance is generally contained in an amount of 10 to 80% by volume, preferably 20 to 70% by volume. These substances promote the thermal deformation of the above described metal layer, such as melting, evaporation or aggregation, etc., by preventing reflection or by other undesirable phenomena. As substances used for such a purpose, it is possible to use, for example, oxides such as $Pb O$, $WO_3$, $TiO_2$, $SiO$, $SiO_2$, $ZrO_2$, $SnO$, $SnO_2$, $InO$, $In_2O_3$ or $In_2O$, etc.; chalcogenide compounds containing Ge, In, Sn, Cu, Ag, Fe, Bi, Zn or V, etc.; halides such as $PbX_2$, $AgX$, $SnX_2$, $SbX_5$ or $SbX_3$ (wherein X represents fluorine, chlorine, bromine or iodine), etc.; and As, Sb, P, Ge, Si and Te, etc. Among these, GeS, SnS and $PbI_2$ are particularly suitable.

Further, per the present invention a protective layer composed of an organic high molecular weight material as a main component may be provided on the metal layer in order to increase the mechanical strength of the recording material. In this case, however, it is necessary to select the organic high molecular weight material or the thickness of the layer thereof so as not to prevent thermal deformation of the metal layer by absorption of the laser beam. As the organic high molecular weight materials used for such a purpose, there are, for example, natural products such as gelatin, gelatin derivatives or cellulose derivatives, latex-like vihicle compounds and synthetic polymers such as polyurethane, polyvinylidene chloride, polyvinyl acetate, polyvinyl butyral, polycarbonate, polyamide, polyester, fluorocarbons, polyacrylonitrile and copolymers thereof, etc.

The recording materials of the present invention are charactertized by a thin stabilizing film composed of at least one metal selected from In, Al, Au, Ag, Rh, Pd, Ir and Pt is provided on at least one face of the recording layer in order to prevent deterioration of the thermal recording layer by the passage of time. Of these metals, In is particularly preferred for the purpose. These metals may be used alone or may be used as a combination of two or more thereof. Application of the film can be carried out by suitable means, such as vapor deposition, sputtering or ion-plating, etc., and a suitable thickness of the film is 20 to 100 Å. When the thickness is less than 20 Å a sufficient stabilizing effect cannot be obtained. When it is more than 100 Å, the sensitivity of the resulting recording material is decreased.

By providing the stabilizing film, it is possible to prevent permeation of moisture or oxygen in the air through the base, whereby the deterioration of the recording layer with the passage of time can be prevented. This reason is believed to be that the above described metal applied becomes a passive state.

The recording materials of the present invention are used for recording various information on the recording layer by, for example, a modulated argon laser beam, and they can be used as a photo disk where information is recorded by flash exposure through a chromium mask having recorded information, the recorded information being reproduced by optical means.

The recording materials of the present invention are illustrated with reference to examples shown in the appended drawings.

FIG. 1 shows a recording material of the single recording layer type according to the present invention, wherein a thermal recording layer 2 and a suitable protective layer 3 are provided on a transparent plastic base 1. In this example, a stabilizing film 4 according to the present invention is provided between the base 1 and the thermal recording layer 2. Such a film may be provided between the protective layer 3 and the thermal recording layer 2 or may be provided on both faces of the recording layer.

Figure 2:
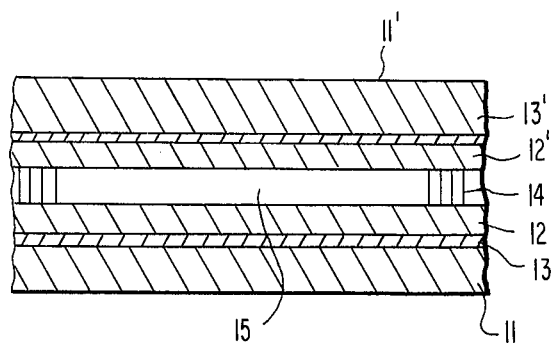

FIG. 2 shows a more preferred example of an air-sandwich type recording material of the present invention, wherein a recording element comprising a base 11 and a thermal recording layer 12 and a recording element comprising a base 11' and a thermal recording layer 12' are provided with spacers 14 such that the recording layers face each other through an air layer 15. In this recording material, stabilizing films 13 and 13' are provided between the bases 11 and 11' and the recording layers 12 and 12', respectively. Further, such stabilizing film may be provided on the inside of the recording layers or may be provided on both faces of the recording layers. For the spacer, any materials having high mechanical strength and processability can be used, and plastics such as synthetic rubber, metals such as Al, Cu and Fe, papers impregnated with an adhesive and glass can be generally used for the purpose. The two recording elements are bonded via the spacers with conventional adhesives such as an epoxy-based adhesive, a silicone-based adhesive. Where both the base and the spacer are composed of plastics, the two recording elements may be bonded with a solvent capable of dissolving plastics. Methods of producing such an air-sandwich type recording material are described in more detail in, for examples, Japanese Patent Application (OPI) Nos. 1002/78, 156605/77 and 35707/79.

In the following, the present invention is illustrated by an example.

EXAMPLE

A comparative recording material without a stabilizing film was produced by applying a mixture of Sn and SnS in a volume ratio of 3:1 to a polyethylene terephthalate film having a thickness of 100 μm by vapor deposition so as to result in a total thickness of 500 Å.

Further, a recording material having a stabilizing film of the present invention was produced by applying In to the above described recording layer film by vapor deposition so as to result in the stabilizing film having a thickness of 100 Å.

Both recording materials produced as described above were put in a conditioned environment at 60° C. and 98% RH. When the reduction of the optical denstiy of the recording layer with the passage of time was examined, the results shown in FIG. 3 were obtained.

Figure 3:
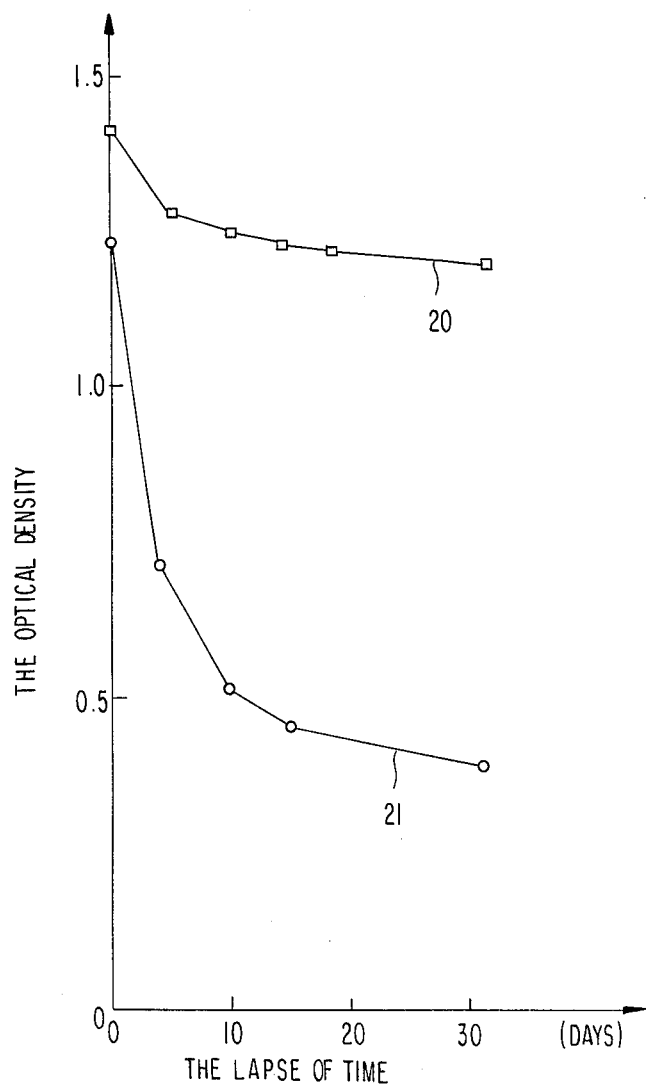

Namely, FIG. 3 is a graph which shows the reduction of optical density of the recording materials with the passage of time, wherein 20 indicates the variation of the optical density of the recording layer in the recording material according to the present invention of this example and 21 indicates that of the optical density of the recording layer of the comparative recording material. It is clearly seen from FIG. 3 that the storability of the recording material was markedly improved by providing the stabilizing film on the recording layer. It was also confirmed that the stabilizing effect was obtained in an air-sandwich type recording material by providing the stabilizing film between the base and the recording layer of each element.

As will be understood from this example, it was ascertained that, in the recording material having a stabilizing film according to the present invention, the reduction of the optical density was remarkably low as compared with one having no stabilizing film.

While the invention has been described in detail and with reference to specific embodiment thereof, it will be apparent to one skilled in the art that various changes and modifications can be made therein without departing from the spirit and scope thereof.

What is claimed is:

1. In thermal recording materials comprising a thermal recording layer of high optical density provided on a base, the improvement wherein the recording layer comprises a mixture of a metal and a substance capable of increasing recording sensitivity, said substance being present in an amount of 10 to 80% by volume and further wherein a stabilizing film composed of at least one metal selected from the group consisting of In, Al, Ag, Au, Rh, Pd, Ir and Pt is provided on at least one face of said recording layer, said film having a thickness of 22 to 100 Å and said stabilizing film preventing deterioration of said recording layer due to moisture or oxygen in the air.

2. Thermal recording materials according to claim 1, wherein said base is a transparent plastic base.

3. Thermal recording materials according to claim 1, wherein said film consists essentially of In.

4. Thermal recording materials according to claim 1, wherein said recording layer is composed of a mixture of at least one metal selected from the group consisting of Sn, Bi and In, and at least one substance selected from the group consisting of GeS, SnS and $PbI_2$.

5. Thermal recording materials according to claim 1, wherein said stabilizing film consists essentially of at least one metal selected from the group consisting of In, Al, Au, Rh, Pd, Ir and Pt.

6. Thermal recording materials according to claim 1, wherein said substance is present in an amount of 20 to 70% by volume.

7. Thermal recording materials according to claim 1, wherein said substance is an oxide.

8. Thermal recording materials according to claim 1, wherein said substance is a halide.

9. In thermal recording materials comprising two recording elements having a thermal recording layer of high optical density provided on a base, and an air layer sandwiched between said recording elements such that said recording layers face each other, the improvement wherein the recording layer comprises a mixture of a metal and a substance capable of increasing recording sensitivity, said substance being present in amount of 10 to 80% by volume and further wherein a stabilizing film composed of at least one metal selected from the group consisting of In, Al, Ag, Au, Rh, Pd, Ir and Pt is provided on at least one face of each of said recording layers, said stabilizing film preventing the deterioration of said recording layer due to moisture or oxygen in the air.

10. Thermal recording materials according to claim 9, wherein said base is a transparent plastic base.

11. Thermal recording materials according to claim 9, wherein said film consists essentially of In.

12. Thermal recording materials according to claim 9, wherein said recording layer is composed of a mixture of at least one metal selected from the group consisting of Sn, Bi and In, and at least one substance selected from the group consisting of GeS, SnS and $PbI_2$.

13. Thermal recording materials according to claim 9, wherein said stabilizing film consists essentially of at least one metal selected from the group consisting of In, Al, Au, Rh, Pd, Ir and Pt.

14. Thermal recording materials according to claim 9, wherein said stabilizing film has a thickness of 20 to 100 Å.

15. Thermal recording materials according to claim 9, wherein said substance is present in an amount of 20 to 70% by volume.

16. Thermal recording materials according to claim 9, wherein said substance is an oxide.

17. Thermal recording materials according to claim 9, wherein said substance is a halide.

* * * * *